(12) United States Patent
Zhan et al.

(10) Patent No.: US 12,007,566 B2
(45) Date of Patent: Jun. 11, 2024

(54) HEAD-MOUNTED DISPLAY APPARATUS AND OPTICAL DISPLAY SYSTEM

(71) Applicants: University of Central Florida Research Foundation, Inc., Orlando, FL (US); Goertek Inc., Shandong (CN)

(72) Inventors: Tao Zhan, Orlando, FL (US); Junyu Zou, Orlando, FL (US); Shin-Tson Wu, Orlando, FL (US); Sheng Liu, Santa Clara, CA (US); Jilin Yang, Santa Clara, CA (US)

(73) Assignees: University of Central Florida Research Foundation, Inc., Orlando, FL (US); Goertek Inc, Shandong (CN)

(*) Notice: Subject to any disclaimer, the term of this patent is extended or adjusted under 35 U.S.C. 154(b) by 685 days.

(21) Appl. No.: 17/265,457

(22) PCT Filed: Aug. 5, 2020

(86) PCT No.: PCT/CN2020/107058
§ 371 (c)(1),
(2) Date: Feb. 2, 2021

(87) PCT Pub. No.: WO2021/023212
PCT Pub. Date: Feb. 11, 2021

(65) Prior Publication Data
US 2022/0299766 A1    Sep. 22, 2022

Related U.S. Application Data

(60) Provisional application No. 62/882,650, filed on Aug. 5, 2019.

(51) Int. Cl.
G02B 27/01 (2006.01)
G02B 5/30 (2006.01)
G02B 27/28 (2006.01)

(52) U.S. Cl.
CPC ....... *G02B 27/0172* (2013.01); *G02B 5/3025* (2013.01); *G02B 27/286* (2013.01); *G02B 2027/0116* (2013.01)

(58) Field of Classification Search
CPC ........ G02B 2027/0116; G02B 27/0101; G02B 27/0172
See application file for complete search history.

(56) References Cited

U.S. PATENT DOCUMENTS

| 10,133,168 B1 | 11/2018 | Taylor et al. |
| 2016/0047955 A1 | 2/2016 | Tabirian et al. |
| 2019/0018248 A1* | 1/2019 | Nishiyama ........... G02B 5/3083 |

FOREIGN PATENT DOCUMENTS

CN    206224048 U    6/2017

OTHER PUBLICATIONS

"Pancharatnam-Berry optical elements for head-up and near-eye displays" Zhan, et al., Journal of the Optical Society of America, vol. 36, No. 5, May 2019.
(Continued)

*Primary Examiner* — Ryan D Howard
(74) *Attorney, Agent, or Firm* — Baker Botts, LLP

(57) ABSTRACT

A head-mounted display apparatus and an optical display system are disclosed. The head-mounted display apparatus comprises: a display assembly, which outputs light of an image, a lens assembly, placed in front of the display assembly to enlarge the image and produce the first aberration of a first direction; and a planar optical assembly, placed between the display assembly and the lens assembly, wherein the planar optical assembly produces the second aberration of a second direction opposite to the first direction to correct the first aberration.

7 Claims, 5 Drawing Sheets

(56) References Cited

OTHER PUBLICATIONS

"Limits of Pancharatnam Phase Lens for 3D/VR/AR Applications" Yousefzadeh, et al., SID 2019 Digest.
"Recent Progress in Pancharatnam-Berry Phase optical elements and the applications for virtual/augmented realities" Lee, et al., Open Data Process Storage 2017; 3;79-88.

\* cited by examiner

HEAD-MOUNTED DISPLAY APPARATUS AND OPTICAL DISPLAY SYSTEM

CROSS-REFERENCE TO RELATED APPLICATION

This application is a National Stage of International Application No. PCT/CN2020/107058, filed on Aug. 5, 2020, which claims priority to U.S. Provisional Utility Patent Application No. 621882,650, filed on Aug. 5, 2019, all of which are hereby incorporated by reference in their entireties.

SPONSORED RESEARCH

The invention was made with funding from GoerTek Electronics, Inc. under project 6501-8684. GoerTek Electronics, Inc. has certain rights in the invention.

FIELD OF THE INVENTION

This disclosure relates to optical display system and more specifically, relates to a head-mounted display apparatus and an optical display system.

BACKGROUND OF THE INVENTION

Display apparatus such as head-mounted displays, head-up displays and general imaging systems will deal with chromatic aberration to improve the imaging quality. A compact chromatic aberration correction system will bring many benefits to such a display apparatus.

For example, decent virtual reality (VR) headsets need high-quality head-mounted display (HMD) technologies that can provide high imaging quality within a large field-of-view to offer an immersive experience for users. Conventionally, only a singlet lens is employed in the HMD system to magnify the display panel due to the requirement of compact form factor and lightweight. However, conventional PR HMDs suffer from significant aberrations at edge field due to limited aberration controllability of the singlet lens. Using a traditional doublet lens may introduce heavier weight and make the system bulkier. Thus, computational digital chromatic aberration correction is implemented, especially for the transverse chromatic aberration. The computational digital chromatic aberration correction will take considerable computation power and memory when high-resolution graphics are processed. So, it is desirable in HMDs that the optical chromatic aberrations can be reduced through an optical approach, so as to provide high-quality virtual images while relieving the burden of computational image processing.

Conventional viewing optics in HMDs is a singlet made of plastics for lightweight and convenience of mass production. Although employing a complex stack of lenses could effectively reduce the chromatic and monochromatic aberrations as in the camera systems, the viewing optics assembly can be too bulky and heavy to be applied for head-mounted applications.

SUMMARY OF TRE INVENTION

One object of this disclosure is to provide a new technical solution for optical display system.

According to a first aspect of the present disclosure, there is provided a head-mounted display apparatus, comprising: a display assembly, which outputs light of an image; a lens assembly, placed in front of the display assembly to enlarge the image and produce the first aberration of a first direction; and a planar optical assembly, placed between the display assembly and the lens assembly, wherein the planar optical assembly produces the second aberration of a second direction opposite to the first direction to correct the first aberration.

According to a second aspect of the present disclosure, there is provided an optical display system, comprising: a first circular polarizer, which converts light of an image from a display component into a circular polarization light a planar optical assembly, a lens assembly, which enlarges the image and produces the first aberration of a first direction; and wherein the planar optical assembly produces the second aberration of a second direction opposite to the first direction to correct the first aberration.

According to an embodiment of this disclosure, a compact form factor for an optical display system can be provided.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the invention.

DETAILED DESCRIPTION OF THE EMBODIMENTS

Figure 1:
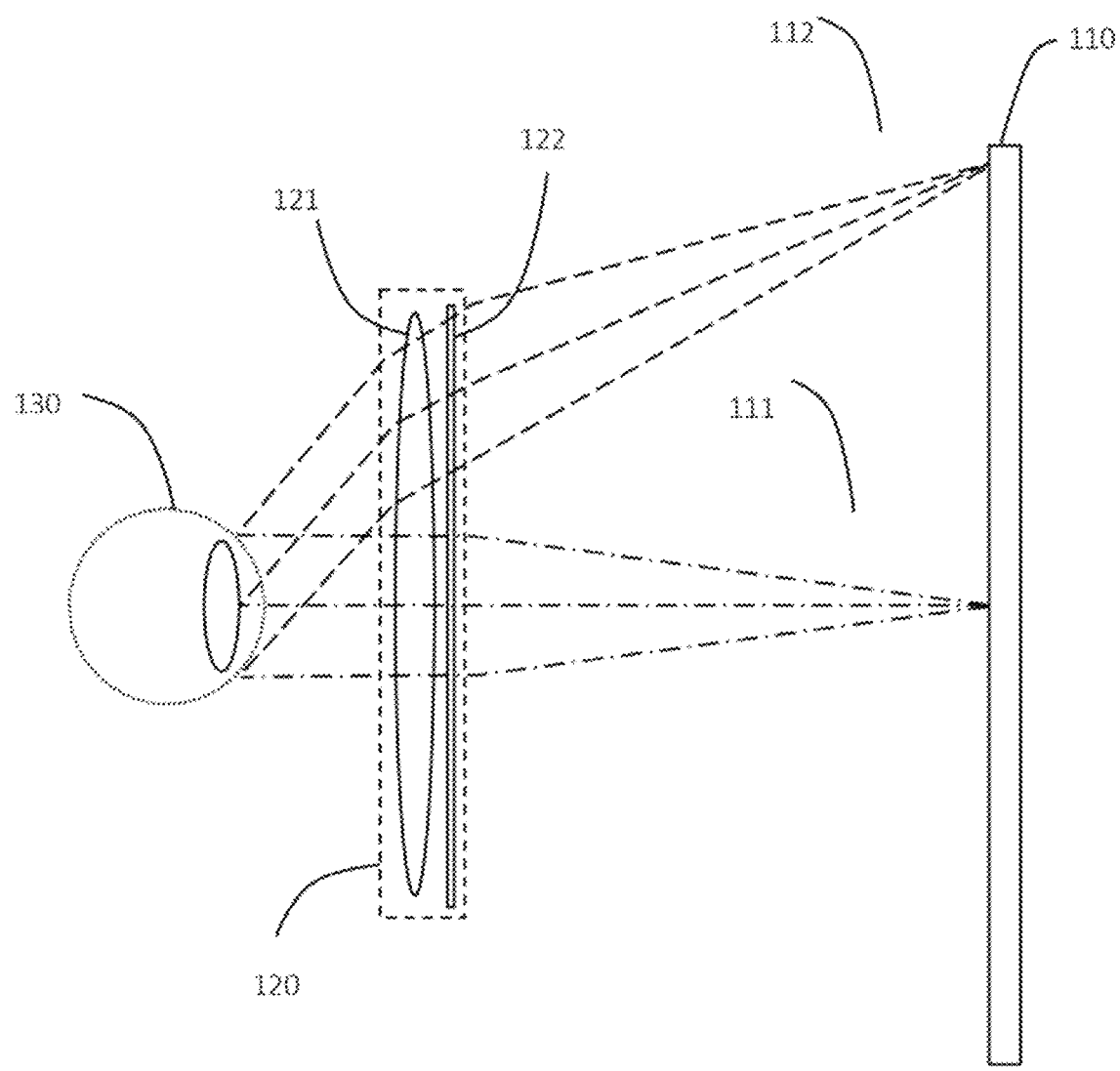
FIG. 1 is a schematic cross-sectional diagram of an optical display system according to an exemplary virtual reality application embodiment of this disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit than invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 5:
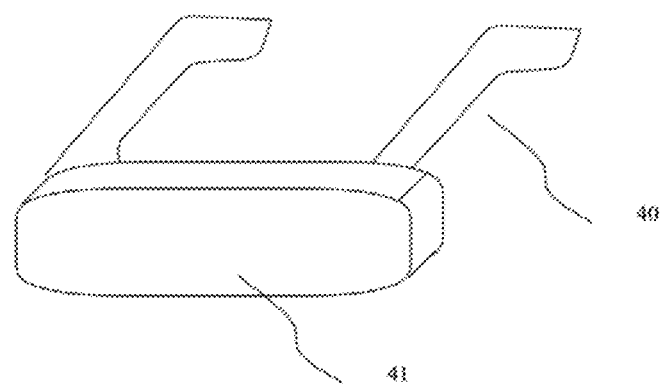
FIG. 5 is a schematic diagram of a head-mounted display apparatus.

FIG. 5 shows a schematic diagram of a head-mounted display apparatus. The head-mounted apparatus 40 comprises a display assembly, a lens assembly and a planar optical assembly. The display assembly, the lens assembly and the planar optical assembly may be located inside the part 41 of the head-mounted apparatus 40 and may be those as shown in FIG. 1. The head-mounted display apparatus 40 comprises a support structure to support fire optical display system therein and thus it is wearable by a viewer.

As shown in FIG. 1, the display assembly 110 outputs light of an image. The lens assembly 121 is placed in front of the display assembly to enlarge the image. The lens assembly 121 produces the first aberration of a first direction. The planar optical assembly 122 is placed between the display assembly 110 and the lens assembly 121. The planar optical assembly 122 produces a second aberration of a second direction opposite to the first direction to correct the first aberration.

Figure 4:
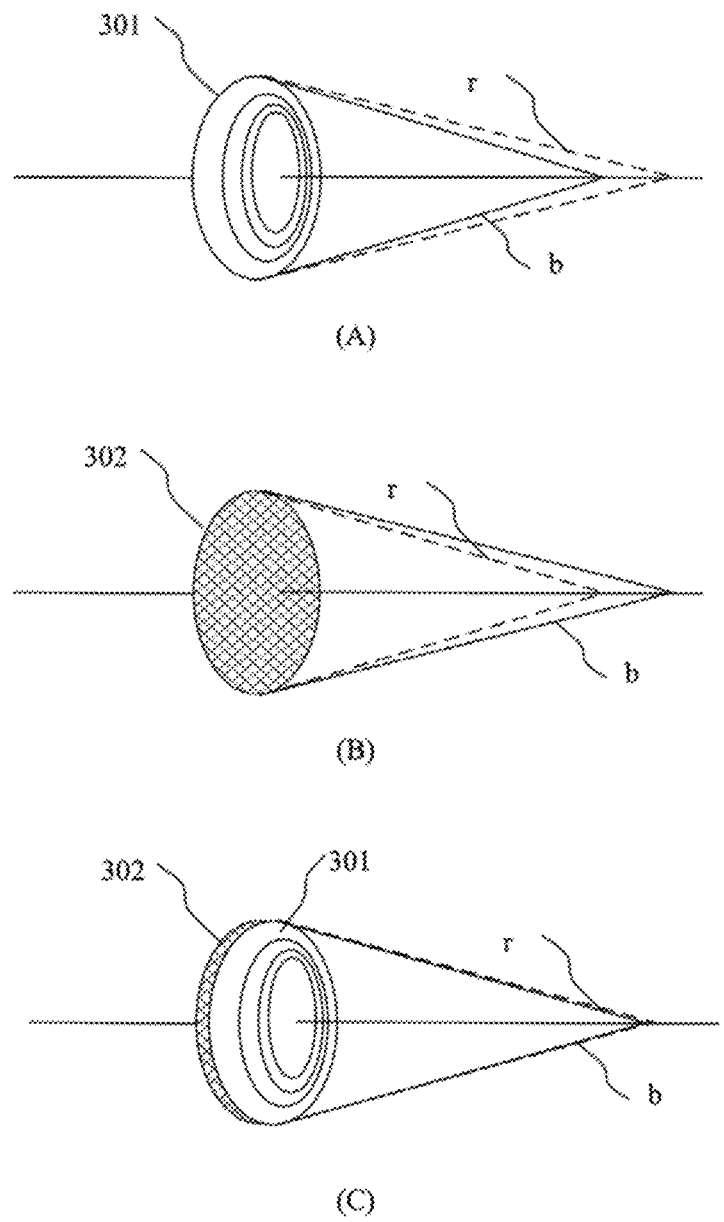
FIG. 4 is a schematic diagram of explaining the chromatic aberrations of a lens assembly and an optical assembly.

FIG. 4 shows diagrams of explaining the chromatic aberrations correction by the lens assembly 121 and the optical assembly 122. In FIG. 4, a first light ray with a first frequency such as a red light ray is shown as dash line r, and a second light ray with a second frequency such as a blue light ray is shown as solid line b.

FIG. 4(A) schematically shows the light ray transmitting through the lens assembly 121. In FIG. 4(A), the first light ray r has a longer focal length than that of the second light ray b. In FIG. 4(A), the first light ray r converges at a farther position while the second ray b converges at a closer position.

FIG. 4(B) schematically shows the light ray transmitting through the optical assembly 122. In FIG. 4(B) the second light ray h has a longer focal length than that of the first light ray r. In FIG. 4(B), the second light ray b converges at a farther position while the first ray r converges at a closer position.

FIG. 4(C) schematically shows the light ray transmitting through the combination of the lens assembly 121 and the optical assembly 122. Because the optical assembly 122 produces the second aberration of second direction opposite to that of the lens assembly, the first light ray r and the second light ray b converge at the same position and the chromatic aberration is corrected.

Here, the optical assembly 122 is planar and thus can provide a compact form factor. The planar shape of the optical assembly 122 will provide a benefit in assembling into the head-mounted display apparatus. The compact functional planar optics have certain advantages for applications which demand a compact form factor.

In FIG. 1, the lens assembly 121 and the optical assembly 122 are collectively indicated as an optics block 120. They can be assembled together as a unit for sale.

The light from the display assembly 110 goes through the optics block 120 and then enters a viewer's eye 130.

The display assembly or component 110 can be a conventional LCD (liquid crystal display), an OLED (organic light-emitting diode) display, mini-LED backlit LCD, an LCoS (liquid-crystal-on-silicon) display, a micro-LED display, a fiber scanning display, or other display components as known in the art or emerges in the future. The display component 110 outputs or is adapted to output a polarized light (virtual) image. Typically, display components such as LCD and LCoS displays produce polarized outputs. If the display output is not inherently polarized, as produced by, e.g., a micro-LED display, an OLED display, or a fiber scanning display, a polarizer and a waveplate or retarder can be disposed on the output side of the display component as known in the art to generate a desired polarization state of the output light. Light from the display assembly 110 may transmit the optics block 120 at normal incidence as light ray 111, or oblique incidence as light ray 112.

The lens assembly 121 can be a plano-convex lens, a biconvex lens, an aspheric lens, a Fresnel lens or a hybrid kind of above. It is preferable to use a Fresnel or planar surface adjacent to the planar optics assembly 122 for the convenience of alignment and fixation. The lens assembly 121 has a planar surface towards the optical assembly for the convenience of alignment and fixation.

The lens assembly 121 may be plastic lens. For example, the lens assembly 121 may have one Fresnel surface and one aspheric surface, both of which are designed together with the planar optics assembly 122. Alternatively, the lens assembly 121 is a singlet lens, which may have two aspheric surfaces, and both of the two surfaces are designed together with the planar optics assembly 122. Alternatively, the singlet lens may have two Fresnel surfaces, both of which are designed together with the planar optics assembly 122.

Figure 2:
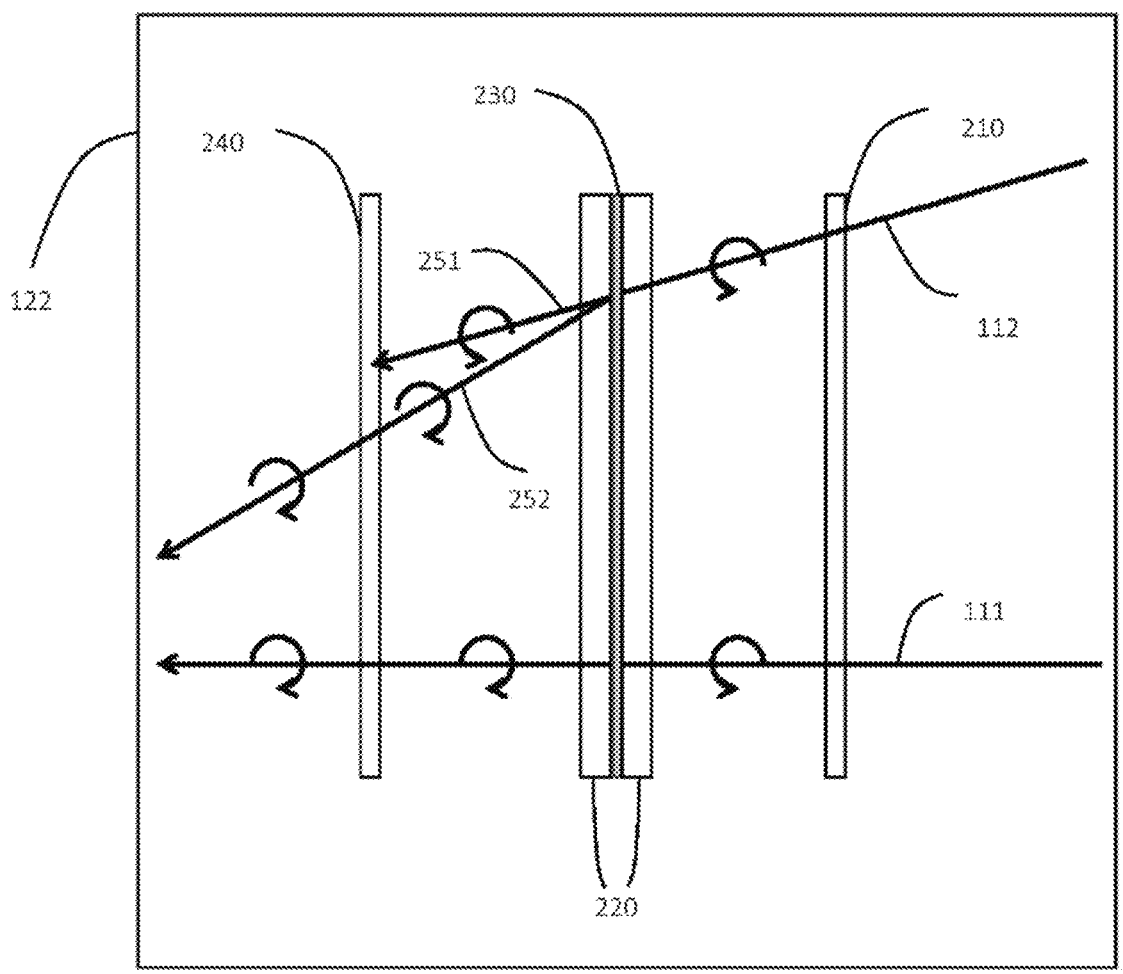
FIG. 2 is a schematic cross-sectional diagram of the planar optics assembly in accordance with one embodiment.

FIG. 2 depicts the details of the planar optics assembly 122. FIG. 2 shows a circular polarizer 210, which converts the polarization state of the light from the display assembly 110 into circular polarization. If the light from the display assembly 110 is linearly polarized, then the circular polarizer 210 can be replaced with a quarter-wave plate at the same position. If the display assembly 110 produce a circular polarization light, the circular polarizer 210 may be omitted. Alternatively, the circular polarizer 210 may be removed from the planar optics assembly 122 and be incorporated into the display assembly 110. For example, the display assembly 110 comprises a display component and a first circular polarizer, which is similar to the circular polarizer 210 and converts light from the display component into the circular polarization light. In such a situation, the planar optics assembly 122 receives circular polarization light. The circular polarization light is right-handed or left-handed circular polarization light.

The planar optics component 230 may be a liquid crystal diffractive film, preferably a liquid crystal polymer diffractive film. The polarization-dependent planar optics included in the planar optics assembly 122 further includes two transparent substrates 220, and the liquid crystal diffractive film is sandwiched between the two substrates 220. The liquid crystal polymer diffractive film may have similar attributions to those of the lens disclosed in [Nelson V. Tabirian, David. E. Roberts, Diane M. Sleeves, and Brian R. Kimball, "Diffractive Waveplate Lenses for Correcting Aberrations and Polarization-Independent Functionality," US Patent 2018/0039003A9, which is hereby incorporated here as a reference]. The circularly polarized light rays totally diffracted by the planar optics component 230 are converted to the opposite handedness by the planar optics such as light ray 111. Some light rays, such as light ray 112, are partially diffracted by the planar optics component 230, where the diffracted part is converted to the other orthogonal handedness as light ray 252, and the leaking part maintain its original handedness as light ray 251. The second circular polarizer 240 blocks the light rays from the zero-order leakage of the planar optics, such as light ray 251, to eliminate the unwanted ghost image.

The planar optics component 230 may have a mono-layer or multi-layer structure with spatial-varying anisotropy. The planar optics component 230 has a phase profile to correct the aberrations of the optics assembly 121.

The planar optics components 230 included in the optical assembly 122 may include a polarization-dependent planar optics, which functions by a Pancharatnam-Berry phase. The diffractive Pancharatnam-Berry phase optics is low-cost and has high-quality broadband. The diffractive Pancharatnam-Berry phase optics may be made of liquid crystal (LC) polymer, which manifests opposite chromatic aberration to that of lens assembly 121 such as a refractive lens. Thus, as shown in FIG. 4(A), the planar optical assembly 122 may attached to the lens assembly 121 such as a Fresnel lens. The chromatic aberration of the head-mounted display apparatus can be corrected. Compared to conventional diffractive optical elements and metasurfaces, the fabrication of the diffractive Pancharatnam-Berry phase optics is simpler and more cost-effective. The diffractive Pancharatnam-Berry phase optics has dynamic phase.

Furthermore, the diffractive Pancharatnam-Berry phase optics is polarization-sensitive. Thus, the stray light from diffraction leakage can be eliminated by a second polarizer 240. Specifically, the polarization-dependent planar optics 220, 230 receives a right-handed or left-handed circular polarization light and which convert most of the right-handed or left-handed circular polarization light into left-handed or right-handed circular polarization light and leak the rest right-handed or left-handed circular polarization light. The polarization blocker 240 block the leaked right-handed or left-handed circular polarization light. That is, the polarization-dependent planar optics receives the circular polarization light output by the display assembly and which convert most of the circular polarization light into an opposite handedness circular polarization light and leak the rest circular polarization light with original handedness; and a polarization blocker, which block the leaked circular polarization light.

As shown in FIG. 2, the polarization blocker is a second circular polarizer 240. The second circular polarizer 240 blocks the leaked circular polarization light with original handedness and passes the opposite handedness circular polarization light. The second circular polarizer blocks the leaked circular polarization light with original handedness and passes the opposite handedness circular polarization light.

Moreover, the diffractive Pancharatnam-Berry phase optics or Pancharatnam-Berry phase lens) usually has a flat physical geometry with a thickness of only several microns, which can flawlessly satisfy the need for lightweight and compactness in head-mounted displays.

As shown in FIG. 1, the optical display system 120 may be manufactured separated. With reference to FIG. 2, the optical display system 120 comprises: a first circular polarizer 210, which converts light of an image from a display component into a circular polarization light; a planar optical assembly 122 and a lens assembly 121, which enlarges the image and produces the first aberration of a first direction. The planar optical assembly 121 produces a second aberration of a second direction opposite to the first direction to correct the first aberration.

The optical display system 120 has already been described above in the head-mounted display apparatus, and the repeated descriptions thereof are omitted.

The optical display system 120 may be used in a head-mounted display apparatus for virtual reality VR or other electronic systems. The planar optics can be used to reduce the chromatic and monochromatic aberrations in the viewing optics. The planar optics may show polarization-dependent functionality, broadband high-efficiency in the visible spectrum within the whole field-of-view.

Figure 6:
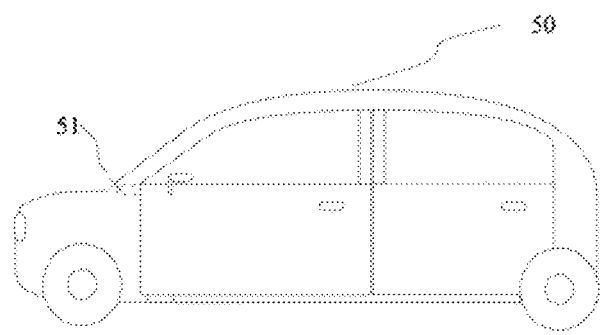
FIG. 6 is a schematic diagram of a vehicle with head up display.

The optical display system may be used in other electronics apparatus. For example, it can be used in a head up display system of a vehicle. FIG. 6 shows a vehicle 50 with such a head up display 51. The optical display system can be incorporated in the head up display 51 to correct the chromatic aberration.

Figure 3:
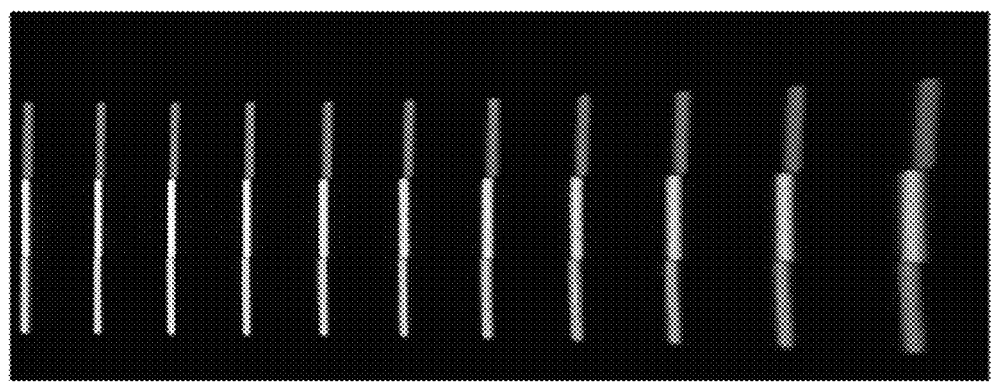
FIG. 3 is a preliminary experimental result of a device exploiting aberration correction technique disclosed in this disclosure.
Figure 3:
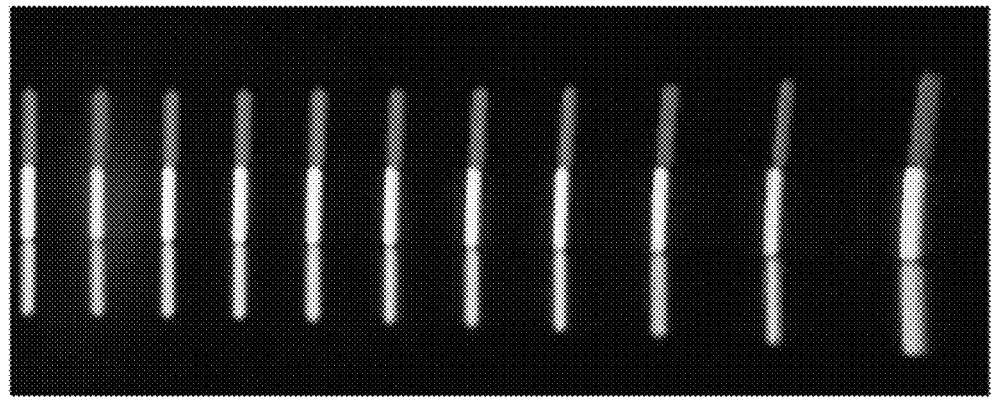

FIG. 3 is a preliminary experimental result of a device exploiting the aberration correction technique disclosed in this patent. A picture showing vertical bars with blue, green, and red coloured segments is displayed on the electronic display. FIG. 3(*a*) shows the perceived image without planar optics assembly; and FIG. 3(*b*) shows the perceived image with planar optics assembly. The transverse chromatic aberration is almost invisible in FIG. 3(*b*) after aberration correction.

In addition to the optical correction, a digital correction can also be used. For example, the impact of the planar optics components 230 on the light rays going through is recorded as a look-up table for digital correction. The extra aberrations, distortions, intensity variation, and colour changes caused by the planar optics are digitally pre-compensated on the electronic display device.

Although some specific embodiments of the present invention have been demonstrated in detail with examples, it should be understood by a person skilled in the art that the above, examples are only intended to be illustrative but not to limit the scope of the present disclosure.

The invention claimed is:

1. A head-mounted display apparatus, comprising:
   a display assembly, adapted to output light of an image;
   a lens assembly, positioned in front of the display assembly and adapted to enlarge the image and produce a first aberration of a first direction; and
   a planar optical assembly, positioned between the display assembly and the lens assembly,
   wherein the planar optical assembly is adapted to produce a second aberration of a second direction opposite to the first direction to correct the first aberration,
   wherein the display assembly comprises: a display component; and a first circular polarizer, adapted to convert light from the display component into circular polarized light,
   wherein the planar optical assembly includes: polarization-dependent planar optics adapted to receive one or more of a right-handed or left-handed circular polarized light and convert at least a portion thereof into oppositely circular polarized light and leak any remaining light; and a polarization blocker, adapted to block the leaked light, and
   wherein the polarization blocker is a second circular polarizer, and the second circular polarizer blocks the leaked light with original handedness and passes the opposite handedness light.

2. The head-mounted display apparatus according to claim 1, wherein the display is further adapted to output circular polarized light.

3. The head-mounted display apparatus according to claim 1 wherein the polarization-dependent planar optics functions by a Pancharatnam-Berry phase.

4. The head-mounted display apparatus according to claim 1, wherein the polarization-dependent planar optics includes a liquid crystal diffractive film.

5. The head-mounted display apparatus according to claim 4, wherein the polarization-dependent planar optics further includes two transparent substrates, and the liquid crystal diffractive film is positioned between the two substrates.

6. The head-mounted display apparatus according to claim 1, the polarization-dependent planar optics is made liquid crystal polymer.

7. An optical display system, comprising:
a first circular polarizer, adapted to converts light of an image from a display component into a circular polarized light;
a planar optical assembly, a lens assembly, adapted to enlarges the image and produces a first aberration of a first direction; and
wherein the planar optical assembly is adapted to produce a second aberration of a second direction opposite to the first direction to correct the first aberration,
the planar optical assembly includes: polarization-dependent planar optics, the polarization-dependent planar optics adapted to receive one or more of a right-handed or left-handed circular polarized light and convert at least a portion thereof into oppositely circular polarized light and leak any remaining light and a polarization blocker, adapted to block the leaked light, and
wherein the polarization blocker is a second circular polarizer, and the second circular polarizer blocks the leaked light with original handedness and passes the opposite handedness light.

* * * * *